United States Patent [19]

Thompson

[11] 4,370,287
[45] Jan. 25, 1983

[54] PREFORM METHOD OF SYNTHESIZING A PHOSPHOR

[75] Inventor: Robert P. Thompson, Millersville, Pa.
[73] Assignee: RCA Corporation, New York, N.Y.
[21] Appl. No.: 246,026
[22] Filed: Mar. 20, 1981
[51] Int. Cl.³ .............................................. B28B 11/00
[52] U.S. Cl. ................................ 264/67; 252/301.4 R; 264/58; 264/118; 264/140
[58] Field of Search .................... 264/58, 67, 118, 140; 252/301.4 R

[56] References Cited

U.S. PATENT DOCUMENTS

| 2,623,858 | 12/1952 | Kroger | 252/301.6 |
| 3,502,590 | 3/1970 | Royce et al. | 252/301.4 |
| 3,825,436 | 7/1974 | Buchanan et al. | 117/33.5 R |
| 3,883,748 | 5/1975 | Nada et al. | 250/484 |
| 4,151,442 | 4/1979 | Koga et al. | 313/467 |

Primary Examiner—Donald E. Czaja
Assistant Examiner—W. Thompson
Attorney, Agent, or Firm—E. M. Whitacre; D. H. Irlbeck; L. Greenspan

[57] ABSTRACT

To synthesize a particulate phosphor, an intimate dry mixture of phosphor-producing compounds is pressed, as by uniaxial or isostatic pressing, to a self-supporting preform of the desired shape and to a prescribed density. Then, the preform is heated to a reaction temperature and cooled to produce a friable cake of phosphor particles. The cake is broken apart, and the phosphor particles are washed and dried.

9 Claims, 4 Drawing Figures

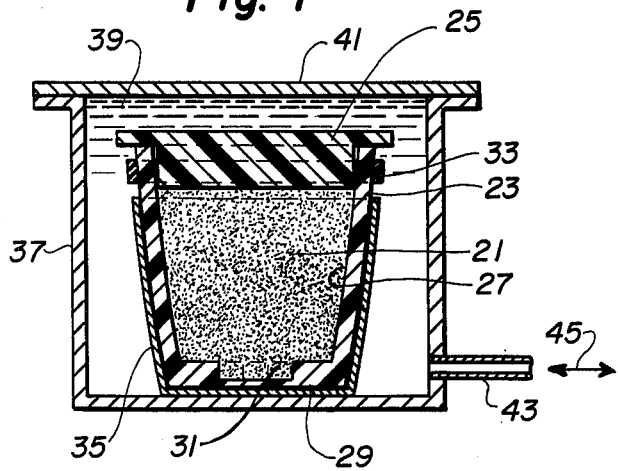
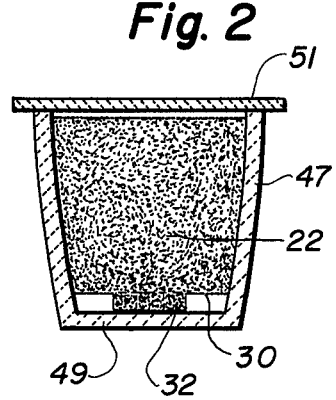
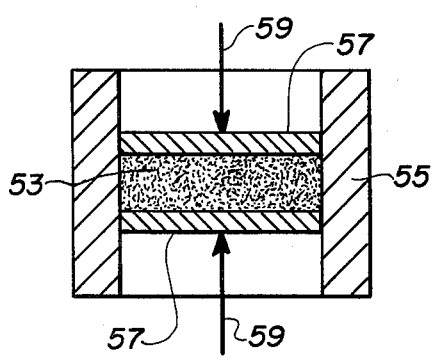
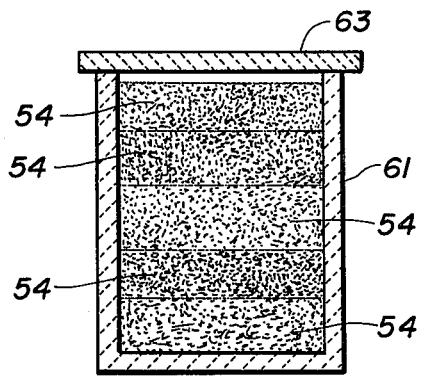

PREFORM METHOD OF SYNTHESIZING A PHOSPHOR

This invention relates to a novel method of synthesizing a phosphor and particularly, but not necessarily exclusively, to such a method for making a particulate phosphor for use in viewing screens of television tubes.

The viewing screen of a television picture tube usually comprises a layer of phosphor particles suitably supported in a cathode-ray tube for excitation by cathode rays. The phosphor particles can be synthesized from mixtures of chemical compounds by methods that are known in the art. In one typical method, an intimate dry, fluffy mixture of compounds containing the constituent chemical elements of the phosphor is packed loosely by hand into a refractory container. The container is covered and then heated to reaction temperatures; that is, temperatures at which the compounds react to form discrete particles of phosphor. The container and contents are cooled to near room temperature, and the contents, which are in the form of a friable cake of phosphor particles, are removed. The particles constituting the cake are broken apart, washed to remove nonluminescent material therein and then dried.

This typical method, when used to manufacture industrial quantities of phosphor, can generate dusts which may be harmful to factory personnel. Also, the initial mixture upon heating may be extremely corrosive to the container, resulting in a shorter-than-desired life for the container as well as a lower-than-desired yield of phosphor. And, because of the loose packing of the dry, fluffy mixture, the yield of phosphor is much less than is theoretically possible. Packing the dry, fluffy mixture has not overcome these problems and has generated other problems. Increased packing pressure may result in broken containers, produce nonuniform packing densities and increase the corrosive action on the containers. Also, the yield of useful phosphor is less than what is theoretically possible.

The novel method follows the prior typical method except that, prior to the heating step, the dry mixture is compressed to a prescribed shape and to a prescribed density, preferably by isostatic pressing, to produce a self-supporting preform. Then, the preform is heated to a reaction temperature to produce a friable cake of phosphor particles. The friable cake is cooled and broken into particles. In the preferred embodiment, the preform is heated in a covered container, although in some embodiments, the preform can be heated in a controlled atmosphere without a container.

In the drawings,

FIG. 1 is a sectional elevational view of an isostatic pressing apparatus with a dry mixture therein during pressing.

FIG. 2 is a sectional elevational view of a covered refractory container with a preform therein.

FIG. 3 is a sectional elevational view of a uniaxial pressing apparatus with a dry mixture therein during pressing.

FIG. 4 is a sectional elevational view of a covered refractory container with a stack of disc-shaped preforms therein.

The following examples illustrate the novel method.

EXAMPLE 1

Prepare a mixture of dry powders suitable for synthesizing europium-activated yttrium oxysulfide phosphor. Suitable mixtures are disclosed in U.S. Pat. No. 3,502,590 issued Mar. 24, 1970, to M. R. Royce et al, which patent is incorporated herein by reference for the purpose of its disclosure. As shown in FIG. 1, a charge 21 of about 3160 grams of the mixture is placed in a semirigid polyurethane bag mold 23. The charge is packed manually into the bag mold 23 so as to obtain a minimum inclusion of air and a maximum amount of solids. After manually packing the charge 21 into the bag mold 23, the charge has an average apparent density of about 1.0 gram per cc, although the solids therein have a calculated average bulk density of about 4.0 grams per cc.

The bag mold 23 is completely filled with the charge and is closed with a tight-fitting overlapping polyurethane lid 25. The bag mold 23 is the shape of a truncated cone about 30 centimeters high with a circular sidewall 27 that is slightly bellied outwardly. The inside of the bottom or endwall 29 is about 10 centimeters in diameter and has a cross-shaped depression 31 therein. The top of the sidewall 27 is pressed radially against the lid 25 with a rubber band 33 to provide a temporary seal between the sidewall 27 and the lid 25. The bag mold 23 is supported in a perforated metal crib 35, and the assembly is placed in an isostatic compression chamber 37 that is filled with an aqueous liquid 39. Other liquids, aqueous or nonaqueous, which can be used for isostatic pressing, can be substituted here. The filled bag mold 23 is completely submerged in the liquid 39, the liquid 39 completely fills the chamber 37, and the chamber 37 is closed with a cover 41. A tube 43 connects to the inside of the chamber 37 and permits hydraulic pressure to be applied to or relieved from the liquid 39, as indicated by the double-headed arrow 45.

A pressure of about 2109 kilograms per square centimeter (30,000 psi) is applied to the liquid 39 through the tube 43 for about 10 minutes. The pressure is exerted substantially equally around the bag mold 23 which, because it is semirigid, transmits the pressure to the charge 21, thereby compressing the charge 21 to a density above about 1.5 grams per cc (cubic centimeter). Air in the charge 21 is compressed. Then, the pressure is slowly relieved permitting an orderly release of the compressed air in the compressed charge 22. The apparatus is disassembled, and the compressed charge or preform 22 is removed from the bag mold 23.

As shown in FIG. 2, the preform 22 is a truncated cone about 7.8 centimeters in diameter and about 28.5 centimeters high with a cross-shaped extension 32 centered at one end 30. The preform 22 is placed in a refractory container or crucible 47 of almost the same internal shape as preform 22 with the extension 32 at the bottom to hold the preform 32 away from the bottom 49 of the crucible 47. The crucible 47, which is substantially entirely filled with the preform 22, is closed with a flat refractory closure 51. A domed closure can be substituted for the flat closure 51 in this example.

The covered crucible 47 is heated at about 1150° C. for about 90 minutes with the covered open side of the crucible 47 facing up, and then cooled to room temperature. During heating, the mixture constituting the preform 22 reacts to produce a friable cake of the desired phosphor. The cooled cake is removed from the crucible 47, soaked in deionized water, and then broken up into particles. The particles are washed free of soluble compounds and then dried. The phosphor product is particulate europium-activated yttrium oxysulfide phosphor which has luminescent properties, such as emission color and brightness, that are substantially equivalent to the phosphor product made by the prior process without isostatic pressing. However, the crucible 47 and cover 51 are less reacted upon during the heating step so that they can be used for more heatings. Also, the yield in grams of useful phosphor per crucible is increased by at least 25 percent over the prior method due to the higher apparent density of the preform as compared to a manually-packed crucible.

EXAMPLE 2

Follow the procedure described in Example 1 except heat the covered crucible with the open side of the crucible 47 facing down; that is, with the preform 22 supported on the flat closure 51, and the crucible 47 covering the preform 22.

EXAMPLE 3

Prepare a mixture of dry powders suitable for synthesizing a phosphor of the composition $0.9ZnS:0.1CdS:Cu(0.006\%):Al(0.006\%)$ phosphor with an additional amount of elemental sulfur. Suitable mixtures are disclosed in U.S. Pat. No. 2,623,858 to F. S. Kroger. About 107 grams of the mixture are placed in a semirigid polyurethane mold and isostatically pressed to a pressure about 1054 kilograms per square centimeter (15,000 psi) to produce a preform. The preform is heated in a covered refractory container at about 1150° C. for about 60 minutes and then cooled to room temperature. During heating the preform is converted to a friable cake of particles of the desired phosphor. The cake is reduced to particles, and the particles are washed free of soluble material and then dried. The phosphor product has a green emission under both ultraviolet and cathode-ray excitation.

EXAMPLE 4

A mixture is prepared of zinc sulfide, about 0.004 weight percent silver as silver nitrate, sodium chloride, magnesium chloride and elemental sulfur. Referring to FIG. 3, about 20 grams of mixture 53 are placed in a steel mold comprising a cylinder 55 and two pistons 57. Uniaxial pressure, as indicated by the arrows 59, of about 527 kilograms per square centimeter (7500 psi) is applied to the pistons 57 to compress the charge therebetween to a preform 54 in the shape of a cylindrical disc.

As shown in FIG. 4, several such preforms 54 are stacked on one another in a cylindrical refractory quartz container 61, and the container is covered with a flat closure 63. The covered container 61 and its contents are heated to about 900° C. for about 75 minutes and then cooled to room temperature. During heating, the preforms 54 are converted to a friable cake of particles of the desired phosphor. The cake is broken into particles. The particles are washed free of soluble material and dried. The product is a particulate blue-emitting silver-activated zinc sulfide phosphor which can be excited with ultraviolet light or cathode rays.

The novel method may be used to synthesize any phosphor by solid-state reaction. By this is meant that a mixture of reactants is heated to such temperatures that, without melting the entire mass, ions in the mixture migrate therein to produce the phosphor in the form of substantially discrete particles which are weakly held together in a friable cake. Not included are those processes where the mixture is heated or hot pressed to produce a solid mass or a mass of interlocked crystals, such that the product must be cut, fractured, or ground to produce slices or particles. Slices of a solid mass are of no use in making luminescent screens where particles are required. Grinding and fracturing blocks or particles of phosphor have the effect of degrading the luminescent properties of a phosphor. In the novel method, the friable cake is broken apart by low shearing forces between the particles, not by grinding and not by fracturing the particles themselves.

The novel method may be used to synthesize any phosphor where the effect of the heating step is to produce a friable cake of phosphor particles. Thus, the temperature range that is usable is dependent on the composition of the preform. The heating temperature should be high enough to synthesize the phosphor but not so high as to rob the cake of its friable character.

The initial charge may be compressed to produce the preform by any convenient process. Isostatic pressing is preferred because it can produce more easily a dense and more uniform preform than other known pressing processes. Either semirigid or nonrigid molds can be used for isostatic pressing. Semirigid molds, which are usually made of polyurethane, maintain their shape during loading. Nonrigid molds, which are usually made of rubber, need a rigid support to maintain their shape during loading.

The initial charge may contain constituents which aid in the compressing step. Elemental sulfur, for example, may be used for this purpose. An important precaution during the compressing step is to release the pressure at such a rate that compressed air therein is released without disrupting the preform. The compressed preform should be entirely self-supporting and have sufficient strength to be handled in a normal way without rupturing. With prior manual packing, the charge was not self-supporting.

With prior manual packing, the average apparent density of the charge is normally in the range of 0.8 to 1.2 grams per cc, depending on the average bulk density of the solids and the proportion of interstices in the charge. Using the novel method, the average apparent density of the charge is increased substantially and is in the range of about 1.0 to 3.0 grams per cc. Thus, substantially more material can be heated in the same refractory container.

The preform may be of any size or shape. For purposes of economy and process control, it has been found desirable that the preform loosely fit the refractory container in which it is heated. The preform 22 shown in FIG. 2 has an extension 32 for the purpose of reducing the amount of physical contact between the preform and the container. This is believed to reduce the amount and rate of degradation of the container during the heating step. The preform shrinks during the heating step, further reducing the amount of contact between the preform and the container. A foil of nonreactive metal such as platinum may be inserted between the extension 32 and the bottom 49 of the container to further reduce this degradation.

I claim:

1. In a method of synthesizing a phosphor including the steps of providing an intimate dry mixture of compounds containing the constituent chemical elements of said phosphor, heating a quantity of said mixture to a reaction temperature to produce a friable cake of phosphor particles, cooling said cake to room temperature, and then reducing said cake to particles, the improvement including, prior to said heating step the steps of compressing said quantity of dry mixture in a mold to a prescribed shape and to a prescribed density to produce at least one self supporting preform, removing said preform from said mold, placing said preform in a closed container and then heating said preform in said closed container to produce said friable cake.

2. The method defined in claim 1 wherein said prescribed density is in the range of about 1.0 to 3.0 grams per cubic centimeter.

3. The method defined in claim 1 wherein said quantity of dry mixture is compressed in a semirigid mold by isostatic pressing.

4. The method defined in claim 1 wherein said quantity of dry mixture is compressed in a nonrigid mold by isostatic pressing.

5. The method defined in claim 1 wherein said quantity of dry mixture is compressed in a rigid mold by uniaxial pressing.

6. The method defined in claim 1 wherein said prescribed shape is related to the internal geometry of said container.

7. The method defined in claim 1 wherein said prescribed shape is substantially the same as the internal shape of said container.

8. The method defined in claim 1 wherein a single compressed shape substantially fills said container.

9. The method defined in claim 1 wherein a plurality of self-supporting preforms substantially fills said container.

* * * * *